Jan. 29, 1963  R. A. ENGLUND  3,075,738
SELF SEALING DISC FOR SPOON TYPE VALVES
Filed Aug. 17, 1955
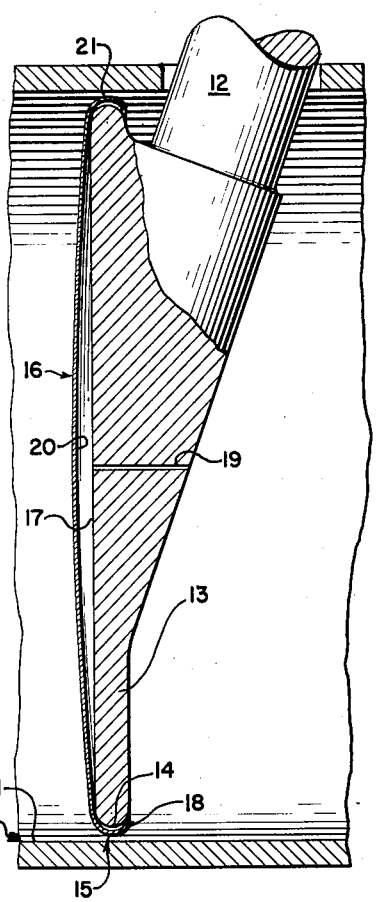
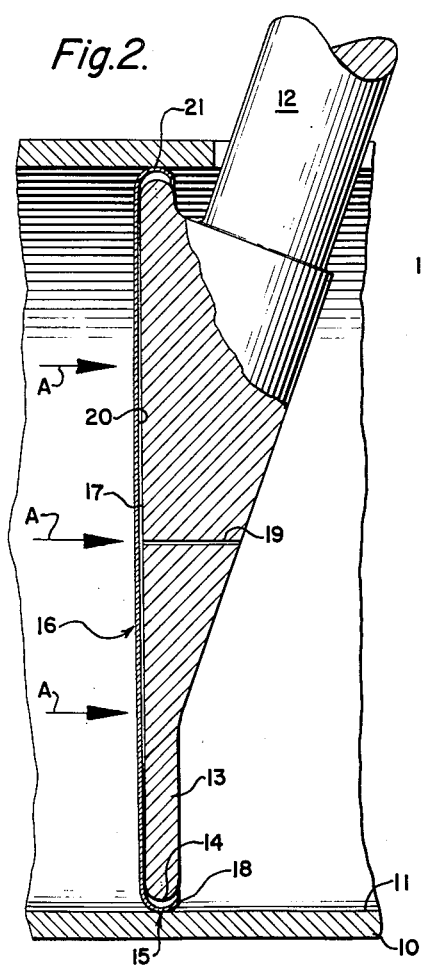
ROBERT A. ENGLUND,
INVENTOR.
BY John H.G. Wallace United States Patent Office 3,075,738
Patented Jan. 29, 1963

3,075,738
SELF SEALING DISC FOR SPOON TYPE VALVES
Robert A. Englund, Phoenix, Ariz., assignor to The Garrett Corporation, Los Angeles, Calif., a corporation of California
Filed Aug. 17, 1955, Ser. No. 528,985
7 Claims. (Cl. 251—86)

This invention relates to a butterfly valve and sealing device, and more particularly to such a device having novel means which permits a butterfly element to center itself in a conduit bore and to thereby attain an intimate sealing engagement of its entire periphery with the wall of said bore.

Heretofore, it has been a problem to construct a butterfly valve wherein the movable sealing element automatically centers itself and provides a sufficiently intimate seal to permit only extremely minute leakage of fluid through the valve. Prior art devices which provide means for centering a butterfly element in a conduit bore usually employ perforate disc elements which permit a relatively great percentage of flow leakage therethrough. In addition, such prior art devices do not provide a combination of elements in which a concentrically arranged centering device co-operates with a flexible means at the periphery of the valve element disc whereby intimate concentric sealing engagement of the valve element with its surrounding bore wall is accomplished.

According to the present invention, an imperforate or leak-proof valve disc element is concentrically mounted and freely movable radially on a supporting member substantially concentric therewith, permitting the periphery of the disc to make an intimate and efficient sealing engagement with the internal wall of a conduit or valve housing.

Valves according to the present invention are particularly capable of withstanding combined high temperatures and pressures.

The present invention is also particularly adapted to the construction of butterfly type, so-called spoon valves. Such valves are characterized by a disc-shaped sealing element supported spoon-like in cantilever fashion by a shaft extending into a valve bore and mounted to rotate the disc-shaped element into and out of closed position with respect to the bore. The shafts of such spoon valves are mounted at an angle to the axis of the disc-shaped element, and most usually at an angle, other than a right angle, to the axis of the disc-shaped element. The present invention as related to such valves is particularly advantageous since it minimizes the torque necessary to crack such a valve from a closed position to an open position. This is due to the fact that the concentric centering device, employed to support the disc-shaped valve element on its actuating shaft, permits exact centering and also movement of the disc-shaped valve element laterally of its axis when rotated about the axis of its supporting shaft.

Another object of the invention is to provide centering and sealing means which is particularly adapted for use in connection with spoon type butterfly valves.

Another object of the invention is to provide a valve construction which, due to its concentric disc centering means, alleviates the necessity for close bearing tolerances previously relied upon to concentrically locate the valve disc element in the valve passage bore.

Another object of the present invention is to provide a butterfly valve construction having means particularly adapted for use in centering an imperforate valve disc element.

Another object of the invention is to provide a valve disc centering device which is located near the periphery of the valve disc in order to provide accurate support of the disc, and at the same time permit freedom thereof when being centered in a valve passage bore.

Another object of the invention is to provide a disc-shaped butterfly valve element and concentric supporting means therefor which have aerodynamically efficient configuration.

A further object of the invention is to provide a valve structure which will operate freely and efficiently when handling fluids at combined high temperatures and pressures.

Other objects and advantages may be apparent from the following specification, appended claims, and accompanying drawings in which:

FIGURE 1 is a fragmentary axial sectional view of a valve construction in accordance with the present invention showing parts and portions in elevation and illustrating the valve sealing element in unpressurized condition;

FIG. 2 is a view similar to FIG. 1 showing the valve sealing element under pressure and in sealed position with relation to the conduit wall surrounding the valve sealing element.

As shown in FIG. 1 of the drawing, a valve housing 10 is provided with a bore 11 which serves as a conduit. Extending into the housing 10 is a pivotally mounted shaft 12 having a disc-shaped portion 13 which is substantially smaller in diameter than the bore 11. The disc-shaped portion 13 is provided with a rim 14 which is engaged by a generally channel-shaped, flexible annular portion 15 of a resilient, disc-shaped valve sealing element 16. The annular, channel-shaped portion 15 is provided with an inwardly directed concave structure which loosely fits the rim 14 of the disc-shaped element 13. The valve sealing element 16 is concavo-convex axially of its resilient disc-shaped structure and when in normal position tends to remain in spaced relation with a pressure supporting face 17 of the disc-shaped element 13. When the disc 16 is assembled with the element 13, the edge 18 of the former is loosely curled about the rim 14 of the latter to provide means for retaining the disc 16 on the element 13. When in normal unpressurized condition, the diameter of the valve sealing element is slightly less than that of the bore 11. Extending through the disc-shaped element 13 is a vent opening 19 which communicates with the normally concave side 20 of the valve sealing element 16.

The valve sealing element 16 is an imperforate, leak-proof member and the edge 18 thereof serves as a structure which axially overlaps the rim 14 of the disc-shaped element 13. The annular channel portion 15 of the valve sealing element 16 in its loosely engaged relation with the rim 14 provides a concentric connection for the valve sealing element 16 and the disc-shaped element 13. The loosely engaged relationship of portion 15 and rim 14 permits slight movement of the valve sealing element laterally of the axis of the disc-shaped portion 13, whereby the valve sealing element is free to center itself in the bore 11.

In operation, the valve as shown in FIG. 1 of the drawing is not subjected to any pressure in the valve housing 10; and the valve sealing element 16 under such conditions assumes its normally concavo-convex shape. When the valve as shown in FIG. 2 of the drawing is subjected to pressure in a direction as indicated by arrows A, the resilient structure of the valve sealing element 16 is deflected into a position against the substantially flat face 17 of the disc-shaped element 13. As the element 16 is deflected from its concavo-convex shape into a substantially flat shape, it expands diametrically; whereupon the periphery 21 of the flexible annular channel-shaped structure 15 intimately engages the wall of the bore 11 of the housing 10. When pressure is relieved and the resilient structure of the element 16 again assumes a concavo-convex shape, as shown in FIG. 1 of the drawing, the peripheral surface 21 thereof is diametrically retracted whereby slight clearance exists between the wall of the bore 11 and the peripheral surface 21. It will be understood that the vent opening 19 assists the escape of fluid from the concave side of the sealing element 16 when it is deflected into a position contiguous with the surface 17 of the disc-shaped element 13.

When the shaft 12 is pivoted about its axis and the disc-shaped element 13 is moved to a partially open position, pressure is relieved from the sealing element 16 and it moves to a concavo-convex shape, whereby its periphery 21 is retracted from the bore 11 permitting it freely to pivot further to a full open position.

It is understood that further modifications of the present invention may be resorted to in a manner limited only by a just interpretation of the following claims.

I claim:

1. In a valve, a body forming a fluid-conducting bore; a flexible concavo-convex valve element having a contour conforming substantially to the cross-sectional shape of said bore, said element having a curled peripheral edge; and means supporting said element for movement in said bore between open and closed positions, the convex side of said element being exposed to fluid pressure when said valve element is in a closed position, said element being movable relative to said supporting means, whereby said pressure tends to flatten said element and move the curled edge into sealing engagement with the wall of said bore.

2. In a valve, means forming a fluid-conducting bore; a relatively thin, flexible valve element in said bore, said element being of concavo-convex form and having a curled peripheral edge; means supporting said valve element, said means having a body relatively loosely embraced by the curled peripheral edge of said valve element; and shaft means supporting said body and valve element for movement in said bore between open and closed position, the loose connection between said body and valve element rendering the latter self-centering in said bore, said body supporting said valve element with the convex side exposed to fluid pressure, whereby said pressure tends to flatten said element and move the peripheral edge thereof into sealing engagement with the wall of said bore.

3. In a valve, means forming a fluid-conducting bore with a circular cross-section; valve means supported for movement in said bore between open and closed positions, said valve means having a supporting disc with a diameter less than that of said bore; and a relatively flexible sealing element disposed on one side of said supporting disc, the edge of said sealing element extending around the edge of said disc to loosely mount the element on said disc for self-centering in said bore, said element being of concavo-convex form and responsive to pressure on the convex side to flatten and move the edge of said element into sealing engagement with the wall of said bore.

4. In a valve, means forming a fluid-conducting bore with a circular cross-section; valve means supported for movement in said bore between open and closed positions, said valve means having a supporting body and a relatively flexible circular sealing element on one side of said supporting body, said sealing element having a curled edge and being relatively loosely mounted on said body to be self-centering in said bore, said element being concavo-convex in form and having an over-all diameter slightly less than that of said bore, said element being responsive to pressure on the convex side to flatten and increase in over-all diameter to equal the diameter of said bore and engage said curled edge with the wall of said bore.

5. In a butterfly valve, a body forming a flow-conducting bore with an annular wall portion; a valve-supporting head disposed for pivotal movement in said bore; an imperforate deformable concavo-convex disc-like valve element of sheet material with substantially uniform thickness loosely mounted on said head for limited radial movement relative thereto, said valve element being movable with said head between a first position substantially parallel with the axis of said bore and a second position substantially at right angles to said bore, said valve element having its convex side upstream in the second position of said valve and being responsive to pressure to increase in diameter, said valve element having a peripheral edge portion for sealing engagement with said annular wall portion, one of said portions being formed of material providing flexibility in a direction radial of said bore when said element is in the second position.

6. In a valve, a body forming a fluid-conducting bore; an imperforate flexible concavo-convex valve element formed of sheet material with a substantially uniform thickness and having a radially deformable edge, said valve element having a contour conforming substantially to the cross-sectional shape of said bore; and means relatively loosely supporting said valve element for movement in said bore between open and closed positions, said loose support rendering said element self-centering, said means supporting said valve element when the latter is in a closed position with the convex side thereof exposed to fluid pressure, whereby said pressure tends to flatten said element and press the deformable peripheral edge thereof into sealing engagement with the wall of said bore.

7. In a valve, a body forming a fluid-conducting bore; an imperforate flexible concavo-convex valve element formed of sheet material with a substantially uniform thickness and having a contour conforming substantially to the cross-sectional shape of said bore, said valve element having a peripheral portion which is deformable in a direction extending radially of said element; and means relatively loosely supporting said valve element for movement in said bore between open and closed positions, said loose support rendering said element self-centering, said means supporting said valve element when the latter is in a closed position with the convex side thereof exposed to fluid pressure whereby the element will tend to flatten and move the deformable peripheral portion into sealing engagement with the wall of said bore.

References Cited in the file of this patent

UNITED STATES PATENTS

| 1,034,370 | McCarty | July 30, 1912 |
| 2,054,064 | Anderson | Sept. 15, 1936 |
| 2,355,017 | Stone | Aug. 1, 1944 |
| 2,688,995 | Wagoner | Sept. 14, 1954 |
| 2,727,471 | Martin | Dec. 20, 1955 |
| 2,742,175 | Parilla | Apr. 17, 1956 |
| 2,789,785 | Woods | Apr. 23, 1957 |
| 2,820,605 | Dougherty | Jan. 21, 1958 |
| 3,008,685 | Rudden | Nov. 14, 1961 |

FOREIGN PATENTS

| 678,619 | Great Britain | Sept. 3, 1952 |

UNITED STATES PATENT OFFICE
CERTIFICATE OF CORRECTION

Patent No. 3,075,738　　　　　　　　　　　　　　　January 29, 1963

Robert A. Englund

It is hereby certified that error appears in the above numbered patent requiring correction and that the said Letters Patent should read as corrected below.

Column 3, line 29, after "curled" insert -- peripheral --.

Signed and sealed this 3rd day of September 1963.

(SEAL)
Attest:

ERNEST W. SWIDER　　　　　　　　　　　　　　　DAVID L. LADD
Attesting Officer　　　　　　　　　　　　　　　Commissioner of Patents